(12) United States Patent
Periyannan et al.

(10) Patent No.: US 6,587,928 B1
(45) Date of Patent: Jul. 1, 2003

(54) SCHEME FOR SEGREGATING CACHEABLE AND NON-CACHEABLE BY PORT DESIGNATION

(75) Inventors: Alagu S. Periyannan, Fremont, CA (US); Michael D. Kellner, Santa Clara, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 0 days.

(21) Appl. No.: 09/515,069

(22) Filed: Feb. 28, 2000

(51) Int. Cl.$^7$ ............................................... G06F 15/16
(52) U.S. Cl. ..................... 711/138; 118/139; 118/130; 118/131; 709/219; 709/245
(58) Field of Search ................. 711/118, 130, 711/133, 138, 139, 131; 709/245, 219

(56) References Cited

U.S. PATENT DOCUMENTS 6,243,760 B1 * 6/2001 Armbruster et al. ........ 709/243
6,351,767 B1 * 2/2002 Batchelder et al. ......... 709/219

OTHER PUBLICATIONS

Hardy, et al "Harvest Effective Use of Internet Information, Harvest User's Manual", Version 1.3, Sep. 7, 1995. pp. 52–61.

Rubarth–Lay, James "Keeping the 400lb. Gorilla at Bay", May 19, 1996. p. 1–15.*

Chankhunthod, et al "A hierarchical Internet Object Cache", Los Angeles, CA. Mar. 1995. p. 1–13.*

* cited by examiner

*Primary Examiner*—T. V. Nguyen
(74) *Attorney, Agent, or Firm*—Blakely Sokoloff Taylor & Zafman LLP

(57) ABSTRACT

Requests are identified as being for a cacheable object or a non-cacheable object according to information included in a Uniform Resource Locator (URL) associated with the object. For example, the URL may include a port designation for requests for cacheable objects (e.g., images and the like). Thus, a request may be recognized as being for a cacheable or non-cacheable object according to the port on which the request is made. In some cases, requests for non-cacheable objects may be made on port 80. A router may be thus configured to recognize a request as being for a cacheable object or a non-cacheable object according to a port on which the request is received and redirect it to a cache as appropriate.

16 Claims, 2 Drawing Sheets

SCHEME FOR SEGREGATING CACHEABLE AND NON-CACHEABLE BY PORT DESIGNATION

FIELD OF THE INVENTION

The present invention relates to a scheme for differentiating cacheable from non-cacheable objects that may be referenced in web pages and the like using port designators within uniform resource locators (URLs) that identify where the objects can be found.

BACKGROUND

The Internet is a vast and expanding network of networks of computers and other devices linked together by various communications media, enabling all these computers and other devices to exchange and share data. Sites on the Internet provide information about a myriad of corporations and products, as well as educational, research and entertainment information and services.

A computer or resource that is attached to the Internet is often referred to as a "host." Examples of such resources include conventional computer systems that are made up of one or more processors, associated memory (typically volatile and non-volatile) and other storage devices and peripherals that allow for connection to the Internet or other networks (e.g., modems, network interfaces and the like). In most cases, the hosting resource may be embodied as hardware and/or software components of a server or other computer system that includes an interface, which allows for some dialog with users thereof. Generally, such a server will be accessed through the Internet from a client computer or other device (e.g., via client applications and/or Web browsers such as Netscape's Navigator™ and Communicator™ and Microsoft's Internet Explorer™) in the conventional fashion.

Briefly, if an Internet user desires to establish a connection with a host (e.g., to view a Web page located thereat), the user might enter into a Web browser program the URL (or Web address) corresponding to that host. One example of such a URL is "http://www.domain.com:80/webpages/mypage.htm". In this example, the first element of the URL is a transfer protocol (most commonly, "http" standing for hypertext transfer protocol, but others include "mailto" for electronic mail, "ftp" for file transfer protocol, and "nntp" for network news transfer protocol). The remaining elements of this URL (in this case, "www" standing for World Wide Web—the Internet's graphical user interface—and "domain.com") include an alias for the "fully qualified domain name" of the host. The number 80 indicates the port number on which the request is being made and is generally optional. The path to the particular file at the host is then set forth (e.g., webpages/mypage.htm).

Each fully qualified domain name, in its most generic form, includes three elements. Taking "computer.host.com" as an example, the three elements are the hostname ("computer"), a domain name ("host") and a top-level domain ("com"). Further, each fully qualified domain name is unique throughout the Internet and corresponds to a numerical Internet protocol (IP) address. IP addresses facilitate communications between hosts and clients in the same way that physical addresses (e.g., 123 Main Street, Anytown, Anycity) facilitate correspondence by mail. Each IP address is made up of four groups of decimal numbers separated by dots. Thus, in the case of the hypothetical host "computer.domain.com", the corresponding IP address might be 123.255.78.91. This format is known as the dotted decimal format. A given host looks up the IP addresses of other hosts on the Internet through a system known as domain name service.

Thus, once a URL is entered into a browser, the corresponding IP address is looked up in a process facilitated by a top-level server. In other words, all queries for addresses are routed to certain computers, the so-called top-level servers. The top-level server matches the domain name to an IP address of a domain name server capable of directing the inquiry to the computer hosting the sought after Web page (or other content) by matching an alphanumeric name such as www.domain.com with its numeric IP address.

The client-server communications that take place across the Internet generally utilize a series of "ports" and "sockets" as well as IP addresses to specify communication pathways. A port is a software abstraction of a physical space through which a client and a server can send messages. Ports are known by numbers, for example port 80 is a well-known port for http communications. Several processes can use the same port at the same time. Sockets are software abstractions that provide communication links between a single server process and a single client process. Several sockets can be created on the same port. Clients and servers use input and output streams to send messages through individual sockets.

FIG. 1 illustrates an example of a conventional client-server transaction. One or more clients 10 are connected to Internet 14 through one or more routers 12. Generally, Internet Service Providers (ISPs) deploy these routers 12 at points of presence (POP) close to their respective users. Often associated with the routers 12 are caches 16. The caches act as information storage devices and generally store web pages and the like at locations that are physically and/or logically close to the ISP's users. That way, requests for content that has been previously cached may be serviced from the cache 16, without having to make queries all the way back to an origin server 18 that may be remote from the requesting client. Using caches in this fashion allows requests to be fulfilled more quickly than would be the case if no cache were used and it also helps to reduce congestion within the Internet 14 by reducing the number of requests that must be processed by the origin server 18.

When a piece of content (e.g., a web page or the like) is requested for the first time (or for the first time in a predetermined time period, etc.), no replica of that content will be stored in cache 16. Nevertheless, the router 12 will pass the request from one of the clients 10 to the cache because such routers are generally configured by their operators to pass all requests to one or more associated caches (which may be grouped in a hierarchical fashion) before passing the request to the origin server. Where the content is not found in the cache 16, the cache 16 will fetch the content from the origin server 18.

Upon receiving a reply from the origin server 18, the router 12 will forward a copy of the content (if it is cacheable) to the cache 16 and also to the requesting client 10. This way, the cache 16 is updated so that later requests for the same content can be serviced from the cache 16 without need to query the origin server 18. This stored replica of the content may be updated periodically, depending on the refresh policies of the cache 16 and the stored content.

As mentioned above, some content is not (or should not be) cacheable. For example, content that varies depending on user input (e.g., the output of a common gateway interface (cgi) or other script) or a web page that is frequently updated at its origin server should not be cached because users will want to receive the most current version of such content. Thus in general, dynamic content should not be cached in order to avoid serving up stale information. Nevertheless, requests for such content may still be directed to the cache 16, however, because such requests are often made on well-known ports that are redirected to a cache as a matter of policy by an ISP. This will result in the user request being serviced slower than if the request were passed directly to an origin server.

SUMMARY OF THE INVENTION

A computer-implemented process is organized to recognize a request as being for a cacheable object or a non-cacheable object according to information included in a Uniform Resource Locator (URL) associated with the object. For example, the URL may include a port designation for requests for cacheable objects (e.g., images and the like). Thus, a request may be recognized as being for a cacheable or non-cacheable object according to the port on which the request is made. In some cases, requests for non-cacheable objects may be made on port 80. One benefit of this scheme is that by providing a mechanism to differentiate between cacheable and non-cacheable content, caches need not be overloaded with unnecessary traffic requesting non-cacheable content.

In another embodiment, a router may be configured to recognize a request as being for a cacheable object or a non-cacheable object according to a port on which the request is received.

In still further embodiments, Uniform Resource Locators (URLs) may be configured to identify whether or not an object associated therewith is to be cached or not. For example, the URLs may include port designations identifying objects as cacheable.

Other features and advantages of the present invention will be apparent from the following discussion.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
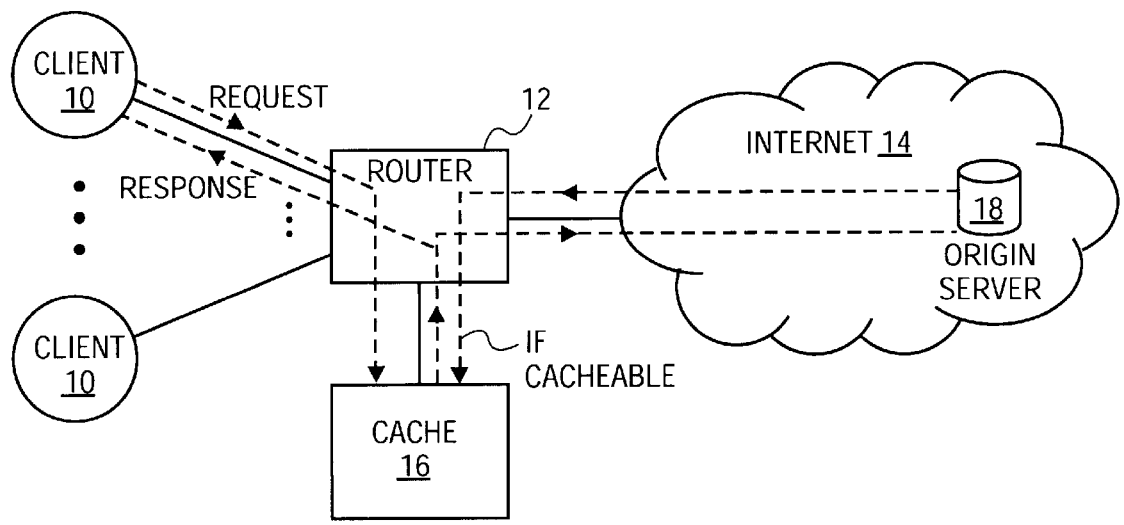
FIG. 1 illustrates an example of a network architecture that may allow for a client-server dialog with or without caching.

Disclosed herein is a scheme for differentiating cacheable from non-cacheable objects that may be referenced in web pages and the like using port designators within uniform resource locators (URLs) that identify where the objects can be found. In essence, the scheme calls for the use of a port number (e.g., port 81) other than the well-known port 80, which is used for conventional http requests, to designate those objects that should be cached. Thus, any requests received on this new port (e.g., port 81) may be cached (i.e., the request may be referred to a cache) while those made on port 80 (or other well-known port number) may be allowed to pass straight through to an origin server (or vice-versa).

Herein, the term cache is meant to describe and/or refer to a device that resides logically between a client and server, or other content source, and that stores information flowing there between in some manner. Caches may be physically co-located with clients, routers, switches and/or servers and/or may be stand-alone devices. Data streams from the source are received at the cache and from there are routed to the requesting clients. En route, each stream can be buffered (stored) and such buffered information can be used to satisfy a number of requests for the content without need for reference back to the original content source.

Although discussed with reference to certain illustrated embodiments, upon review of this specification, those of ordinary skill in the art will recognize that the present scheme may find application in a variety of systems, perhaps with one or more minor variations. Therefore, in the following description the illustrated embodiments should be regarded as exemplary only and should not be deemed to be limiting in scope. Further, it should be kept in mind that some portions of the detailed description that follows are presented in terms of algorithms and symbolic representations (e.g., through the use of flow diagrams, etc.) of operations on data within a computer memory. These algorithmic descriptions and representations are the means used by those skilled in the computer science arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Moreover, unless specifically stated otherwise, it will be appreciated that throughout the description of the present scheme, use of terms such as "processing", "computing", "calculating", "determining", "displaying", "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Again, these are the terms and descriptions commonly used by and among practitioners of ordinary skill in the relevant arts.

Figure 2:
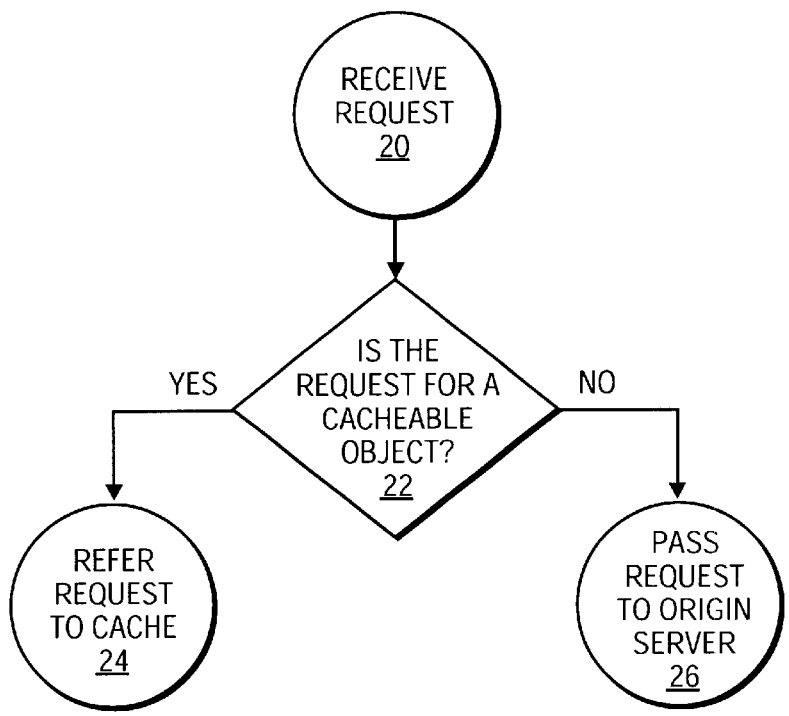
FIG. 2 illustrates an example of a procedure to be used by a router or other node for determining whether or not to direct a client request to a cache for fulfillment.

Turning now to FIG. 2, some further details regarding the present solution to the basic problem outlined above can be stated. In a network configuration such as that shown in FIG. 1, under the present scheme when the router 12 receives a request from a client (step 20), a check is made to determine whether the request is for a cacheable or non-cacheable object (step 22). If the request is for a cacheable object, the request is passed to cache 16 (step 24) as before. However, where the request is for a non-cacheable object, it is passed directly to the origin content server 18 (step 26). One advantage of this scheme is that most conventional routers can easily and very quickly make redirection decisions based on port numbers. It is much more time consuming to make redirection decisions based on (a) free form test that has to be parsed out of some other field (e.g., a path field) in a URL or from information encoded in the header or payload of a data packet.

In this scheme, the determination as to whether the request is for a cacheable or non-cacheable object (step 22) is made depending upon the port number on which the request is made. Ordinarily, http requests (e.g., requests for web pages and the like) are made on port 80. However, under the present scheme, such requests for cacheable content will be made on a different port number (e.g., port 81). Hence, when the router 12 recognizes that the request is being made on this new port number (e.g., port 81), the request will be directed to the cache 16. Those requests that are being made on port 80 (indicating that the request is for non-cacheable content) will be directed to the origin server 18.

The question then becomes how to get the client to make the request on the proper port to allow for redirection to a cache when seeking cacheable content. In one embodiment, the designation of which port a request for an object should be directed to is included in a URL associated with that object. For example, an object pointed to (in the example below an image) or embedded within a web page may ordinarily have a URL of:

http://www.sourceofcontent.com/object.gif If now that URL is modified to:

http://www.sourceofcontent.com:81/object.gif (or, more generally, protocol://domain name:port designation/object) then any request for object.gif will be made over port 81. That is, by adding a port designation to the URL (in the manner specified above), the request for the object can be directed to the desired port.

Consider then a new session between a client 10 and a server 18 that uses the network architecture shown in FIG. 1. The client 10 may initiate the transaction by making an http request over port 80 in the conventional fashion. Because router 12 is configured in accordance with the present invention, the port 80 request is pass straight through to origin server 18, without reference to cache 16.

Now, server 18 may return a web page to the client 10 with one or more embedded objects. Some or all of the URLs associated with these objects (e.g., links to other pages, graphics, and the like) may have modified URLs that include port designations that indicate the objects should be cached. For example, the URLs may include port 81 designations. For these objects, any requests therefor from client 10 will be made on the designated port (e.g., port 81) and router 12 will route the request to the cache because of the port designation and router configuration. Hence, these requests will be referred to cache 16 for fulfillment. If cache 16 (and/or another cache in a cache hierarchy) has a copy of the requested content, the request will be fulfilled out of that content source. Otherwise, the request will be passed back to the origin server and a copy of the requested content will be stored in cache 16 so that later requests for the same content can be fulfilled out of cache 16 without need for reference back to origin server 18.

Figure 3:
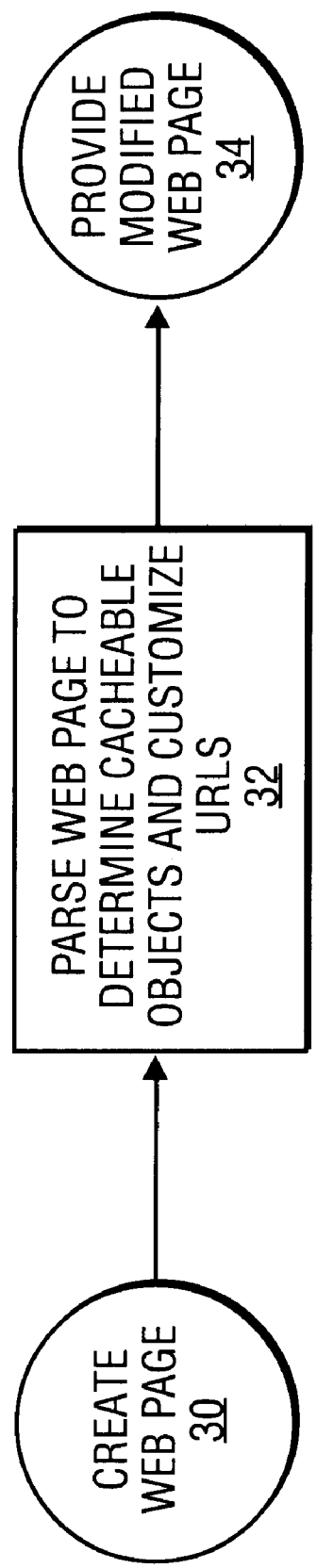
FIG. 3 illustrates an example of a process for creating a Web page with customized URLs for cacheable objects.

Content providers may include the port designators in the URLs for the objects at the time the web pages are created. Alternatively, the Web pages can be created in the conventional fashion and a process similar to that illustrated in FIG. 3 may be applied to add the port designators. First (step 30), the Web page(s) may be created in the conventional fashion using any Web authoring tools the user may choose. In general, these tools all produce HTML output. Then (step 32), the page(s) is/are parsed to determine which objects therein are cacheable and which are not. Cacheable objects may be recognized by any of a variety of techniques, for example according to heuristics that provide rules for cacheable objects. Such rules may require that objects such as images and text (which are not likely to vary with great frequency) will be cacheable. Those objects that vary depending on user input (e.g., scripts and the like) will not be cacheable. The cacheable objects receive modified URLs in accordance with the modifications described above, so that upon request therefor, a router will direct the request to a cache. Non-cacheable objects do not have their associated URLs modified. Finally (step 34), the modified Web page (e.g., the HTML therefor) is provided.

One benefit of the present scheme is that an ISP is always assured of directing its users to the closest (physically and/or logically) available cache. That is, with network architectures such as that shown in FIG. 1, a request for a cacheable object is always referred to the closest cache, resulting in reduced latency and bandwidth savings. At the same time, requests for non-cacheable objects do not suffer from increased delay times, because they are always directed to the appropriate origin server. Thus, the present scheme solves the problem of reducing delay when non-cacheable objects are requested while at the same time allowing cacheable objects to be stored at the closest location to a user or group of users.

Thus a scheme for differentiating cacheable from non-cacheable objects that may be referenced in web pages and the like using port designators within uniform resource locators (URLs) that identify where the objects can be found has been described. Although the foregoing description and accompanying figures discuss and illustrate specific embodiments, it should be appreciated that the present invention is to be measured only in terms of the claims that follow.

What is claimed is:

1. A computer-implemented process comprising recognizing a request as being for a cacheable object or a non-cacheable object according to information included in a Uniform Resource Locator (URL) associated with the object, wherein the URL includes an explicit port designation other than port 80 when the request is for a cacheable object.

2. The process of claim 1 wherein the request is recognized as being for a cacheable or non-cacheable object according to a port designation included in the URL.

3. The process of claim 2 wherein the request is recognized as being for a non-cacheable object when the request is made on port 80.

4. The process of claim 2 wherein the request is recognized as being for a cacheable object when the request is not made on port 80.

5. A system comprising
   a router configured to recognize a request as being for a cacheable object or a non-cacheable object according to a port on which the request is received.

6. A method comprising configuring a Uniform Resource Locator (URL) to identify when an object associated with the URL the object is cacheable when the port designation in the URL is other than port 80 is to be cached by including a port designation information in the URL.

7. The method of claim 6 wherein the object is to be cached when the port designation in the URL is different from port 80.

8. A method comprising redirecting a request from a client communicatively coupled to a network to a resource also coupled to the network according to whether the request is for a cacheable object as determined by a port designation other than port 80 included within a Uniform Resource Location (URL) associated with the object.

9. The process of claim 1 further comprising directing the request to bypass a cache when the request is for a non-cacheable object.

10. The system of claim 5, wherein the router is further configured to direct the request to a cache coupled to the router when the port on which the request is received is different from port 80.

11. The system of claim 10, wherein the router is further configured to direct the request to a server when the object is not located in the cache, wherein the object is stored in the cache after being retrieved from the server.

12. The system of claim 5, wherein the router is further configured to direct the request to a server when the port on which the request is received is port 80.

13. The method of claim 6, wherein the object is to be cached when the port designation information in the URL indicates a port other than port 80.

14. A computer readable medium having stored thereon sequences of instructions which are executable by a system, and which, when executed by the system, cause the system to perform a method, comprising:

recognizing a request as being for a cacheable object or a non-cacheable object according to a port designation other than port 80 included in a Uniform Resource Locator (URL) associated with the object.

15. The computer medium of claim 14, wherein the request is recognized as being for a cacheable object when the URL includes an explicit port designation other than port 80.

16. The computer medium of claim 15, wherein the request is recognized as being for a non-cacheable object when the URL includes an explicit port designation of port 80.

* * * * *